June 21, 1960   B. C. PENDLEBURY   2,941,839
GLARE SHIELD ASSEMBLY FOR ATTACHMENT TO
AUTOMOBILE SUN VISOR
Filed Aug. 9, 1957   2 Sheets-Sheet 1

INVENTOR.
BRUCE C. PENDLEBURY,
BY
McMorrow, Berman + Davidson
ATTORNEYS.

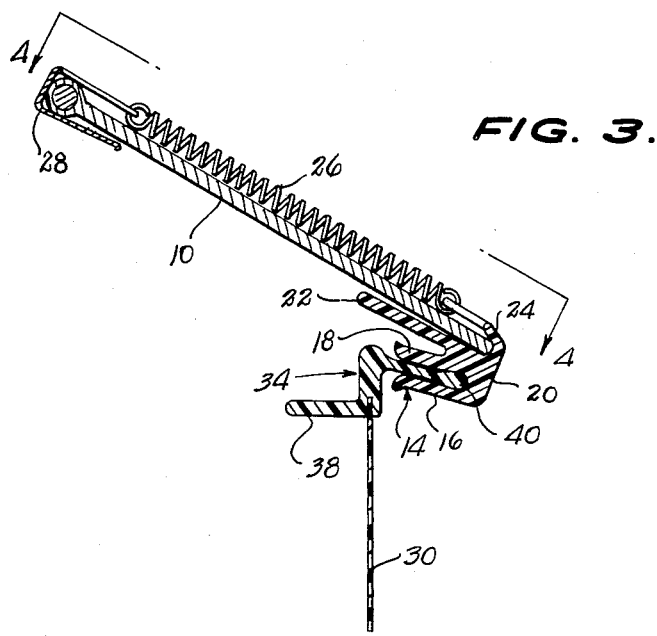
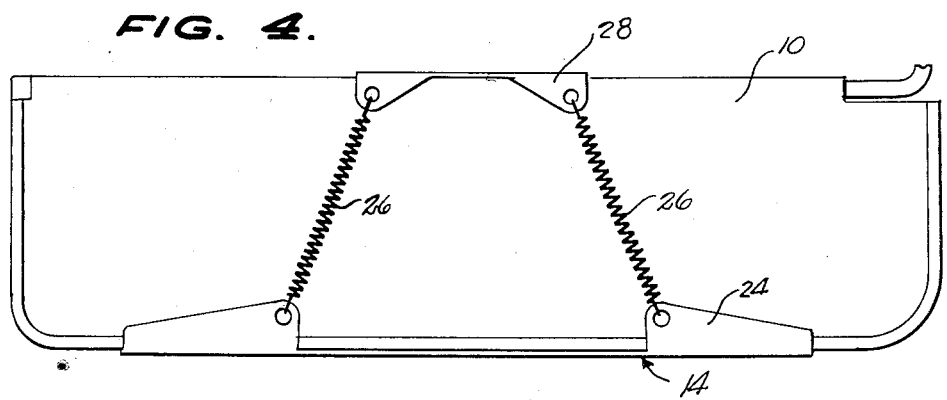
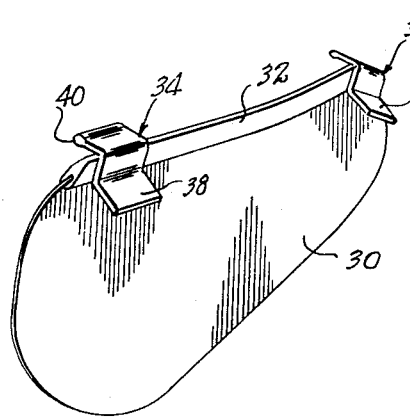
INVENTOR.
BRUCE C. PENDLEBURY,
BY
McMorrow, Berman & Davidson
ATTORNEYS.

United States Patent Office

2,941,839
Patented June 21, 1960

2,941,839

GLARE SHIELD ASSEMBLY FOR ATTACHMENT TO AUTOMOBILE SUN VISOR

Bruce C. Pendlebury, 1035 Francis St., Moose Jaw, Saskatchewan, Canada

Filed Aug. 9, 1957, Ser. No. 677,370

1 Claim. (Cl. 296—97)

The present invention relates to a glare shield assembly for installation in an automobile to reduce the glare of approaching headlights of vehicles.

An object of the present invention is to provide a glare shield assembly which lends itself to ready attachment to and detachment from an automobile sun visor and one which is readily adjusted so as to intercept the light rays of approaching vehicle headlights.

Another object of the present invention is to provide a glare shield assembly which lends itself to attachment to sun visors within a large range of widths, one which is simple in structure and of sturdy construction, one which may be economically manufactured and assembled, and one which is highly effective in action.

These and other objects and advantages of the present invention will be fully apparent from the following description when taken in connection with the annexed drawings, in which:

Figure 3 is a sectional view on an enlarged scale, taken on the line 3—3 of Figure 1;

Figure 4 is a plan view taken on the line 4—4 of Figure 3; and

Figure 5 is an isomertic view of the shield portion of the glare shield assembly according to the present invention.

Figure 1:
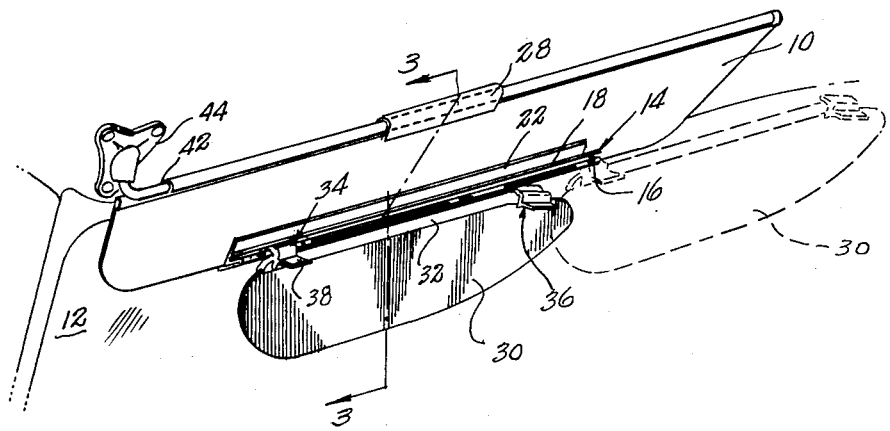
Figure 1 is an isometric view of the forward left portion of an automobile showing a sun visor attached thereto and with the glare shield assembly according to the present invention secured to the sun visor.

Referring to the drawings in which like numerals indicate lake parts throughout the several views, the glare shield assembly of the present invention is for use in an automobile in combination with a sun visor 10 positioned inwardly of and bridging a portion of the windshield 12 of the automobile and comprises a horizontally disposed channel 14 having spaced resilient side walls 16 and 18. The channel 14, shown in section in Figure 3, has a base portion 20, out of which projects the side walls 16 and 18, a flap portion 22 projecting from the base portion 20 at an angle to the side wall 18, and a hook portion 24 projecting in spaced relation with respect to the flap portion 22 and adjacent the flap portion 22. The channel 14 is positioned along the lower longitudinal edge of the visor 10 between the ends of the latter and has the open face of the channel 14 facing away from the visor 10. The hook portion 24 of the channel 14 extends under the lower end edge of the visor 10 and embracingly receives the lower end edge.

A pair of springs 26 extend from spaced parts of the hook portions 24 of the channel 14, as shown in Figure 4, and connect the parts of the hook portions to the end parts of a clip 28, of U-shaped configuration, which extends over the upper end edge of the visor 10. The springs 26, with the clip 28 and the hook portion 24 of the channel 14, constitute means detachably securing the channel 14 to the visor 10.

A translucent shield 30, arranged in an upright direction, is positioned below the open face of the channel 14. Preferably, the shield 30 is fabricated of colored plastic or the like and is provided on its upper end edge with a bead 32 fixedly secured thereto or integrally formed therewith.

A pair of fastening elements 34 and 36, arranged in spaced relation, fixedly project from the upper end of the shield 30 and are formed integrally with the bead 32. Preferably, each of the fastening elements is fabricated of resilient material such as plastic or the like, the one fastening element 34 projecting horizontally from the upper end of the shield 30 and the other fastening element 36 projecting at an angle to the horizontal.

Figure 2:
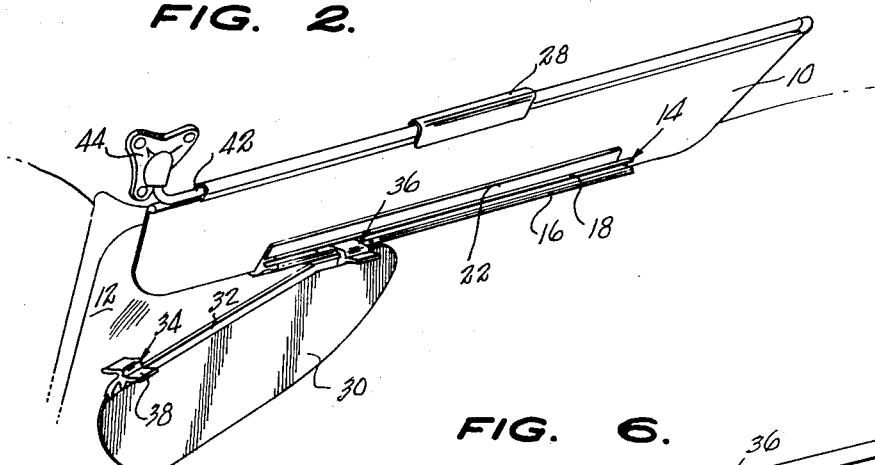
Figure 2 is a view similar to Figure 1, showing the glare shield assembly in another position for intercepting the light rays of approaching automobiles.

Each fastening element 34 and 36 is provided on one end with a finger grip portion 38. The fastening elements 34 and 36 are detachably and frictionally engaged by the channel side walls 16 and 18 and by means of these fastening elements the shield 30 is mainly supported for movement between its stored position (Fig. 6) in which the lower end portion of the shield 30 is inserted behind the flap portion 22 of the channel 14 and a position with either the fastening element 34 inserted through the open face of the channel 14 and detachably and frictionally engaged by the channel side walls 16 and 18 or with the fastening element 36 inserted through the open face of the channel 14 and detachably and frictionally engaged by the channel walls 16 and 18. In either of the positions last named, the shield 30 is dependingly supported in longitudinal alignment with respect to the visor 10 or at an angle with respect to the visor 10, respectively. These last-named two positions are shown in Figures 1 and 2, respectively. The free end portion of each of the fastening elements 34 and 36 is enlarged as at 40 in Figure 3, and the bottom of the groove formed between the side walls 16 and 18 is conformably shaped to fit the enlarged free end portion 40 so as to restrain outward movement of the fastening element 34 or 36 from the channel 14 and to resist lateral twisting of the shield 30 with respect to the visor 10.

Figure 6:
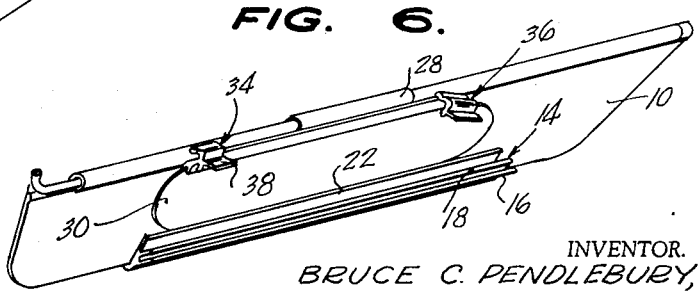
Figure 6 is an isometric view of the shield assembly shown in an out-of-use position.

As shown in Figures 1, 2, and 6, the shield 30 has a portion inwardly of one end cut away at an angle and the adjacent portion of the bead 32 slopes at the same angle so that when the projecting part of the fastening element 36 is inserted between the side walls 16 and 18, the upper and lower faces of the finger grip portion 38 and the projecting part of the fastening element 36 within the channel 14 are horizontal but the shield 30 is at an angle with respect to the horizontally disposed visor 10.

The visor 10 is of conventional construction and is mounted upon a horizontally disposed rod 42 which has one end bent upwardly and pivotally connected in a bracket 44 for swinging movement of the visor 10 about a vertical axis from the position bridging the upper end portion of the windshield 12 to a position adjacent the side of the automobile when desired. The shield 10 is readily moved from the position shown in Figure 1 in which the projecting part of the fastening element 34 is received between and is fixedly engaged by the side walls 16 and 18 of the channel 14 to the position in which the projecting part of the fastening element 36 is received between and fixedly engaged by the side walls 16 and 18, as shown in Figure 2. In an out of use position, the shield 30 is rapidly and easily detached from the channel 14 and has a portion adjacent the lower end thereof easily insertable behind the flap portion 22 for storage of the shield 30 on the side of the visor 10 and movable therewith to an out of the way position flat against the roof or headliner of the automobile, the latter position not being shown.

What is claimed is:

In an automobile, the combination with a windshield, and a sun visor arranged in an upwardly extending direction positioned inwardly of and bridging a portion of said windshield, of a glare shield assembly comprising a horizontally disposed channel including spaced side walls positioned along the lower longitudinal edge of said visor between the ends of said visor and having the open face facing away from said visor, means detachably securing said channel to said visor, and at least two fastening elements arranged in spaced relation and projecting from the upper end of said shield, one of said elements projecting horizontally from the upper end of said shield and the other of said elements projecting at an angle to the horizontal from the upper end of said shield, said one element being insertable through the open face of said channel and detachably and frictionally engaged by said channel walls when inserted for dependingly supporting said shield in longitudinal alignment with respect to said visor and said other fastening element being insertable through the open face of said channel and detachably and frictionally engaged by said channel walls when inserted for dependingly supporting said shield at an angle to said visor.

References Cited in the file of this patent
UNITED STATES PATENTS

| | | |
|---|---|---|
| 1,717,072 | Stadt et al. | June 11, 1929 |
| 2,020,585 | Stansberry | Nov. 12, 1935 |
| 2,112,726 | Kemp et al. | Mar. 29, 1938 |
| 2,458,125 | Winkler | Jan. 4, 1949 |
| 2,542,409 | Guenther | Feb. 20, 1951 |
| 2,812,209 | Sidlo | Nov. 5, 1957 |
| 2,815,978 | Sandberg | Dec. 10, 1957 |

FOREIGN PATENTS

| | | |
|---|---|---|
| 567,958 | Great Britain | Mar. 9, 1945 |